(12) United States Patent
Muir et al.

(10) Patent No.: US 12,314,938 B2
(45) Date of Patent: May 27, 2025

(54) MULTILAYER SYSTEM AND METHOD FOR SECURING A BLOCKCHAIN-BASED TOKEN USING RANDOM TEMPORAL WINDOWING

(71) Applicant: Franklin Resources, San Mateo, CA (US)

(72) Inventors: Michael Muir, San Mateo, CA (US); Igor Natanzon, San Mateo, CA (US); Anirudh Yadav, San Mateo, CA (US)

(73) Assignee: Franklin Resources, San Mateo, CA (US)

( * ) Notice: Subject to any disclaimer, the term of this patent is extended or adjusted under 35 U.S.C. 154(b) by 63 days.

(21) Appl. No.: 18/529,161

(22) Filed: Dec. 5, 2023

(65) Prior Publication Data

US 2024/0185228 A1 Jun. 6, 2024

Related U.S. Application Data

(60) Provisional application No. 63/430,387, filed on Dec. 6, 2022.

(51) Int. Cl.
| | |
|---|---|
| G06Q 20/00 | (2012.01) |
| G06Q 20/36 | (2012.01) |
| H04L 9/08 | (2006.01) |
| H04L 9/30 | (2006.01) |

(52) U.S. Cl.
CPC ......... *G06Q 20/3678* (2013.01); *H04L 9/088* (2013.01); *H04L 9/30* (2013.01)

(58) Field of Classification Search
USPC .............................. 705/16, 21; 380/44, 262
See application file for complete search history.

(56) References Cited

U.S. PATENT DOCUMENTS

2021/0203511 A1* 7/2021 Qi ...................... G06F 16/9024

* cited by examiner

*Primary Examiner* — Dante Ravetti
(74) *Attorney, Agent, or Firm* — David P. Fitzgibbon; Philip J. Foret; Stradley Ronon Stevens & Young, LLP

(57) ABSTRACT

A multi-layer cybersecurity system and method for protecting digital wallets holding blockchain-based tokens traded on a financial platform. Specifically, the invention employs random temporal windowing in relation to: (1) reshuffling designated machines running a multi-party computation protocol; and (2) rekeying of private keys held in both hot and cold environments. Furthermore, environmental based signature weighting is applied to the keys. As a result, cold signers can do anything hot signers can but hot signers cannot do what cold signers can such as taking control, recovering control, or reconstitute the holdings of the wallet in real time, if necessary.

20 Claims, 5 Drawing Sheets

MULTILAYER SYSTEM AND METHOD FOR SECURING A BLOCKCHAIN-BASED TOKEN USING RANDOM TEMPORAL WINDOWING

CROSS-REFERENCE TO RELATED APPLICATION

This application claims the benefit of U.S. Provisional Application No. 63/430,387, filed Dec. 6, 2022, the content of which is incorporated herein by reference in its entirety.

TECHNICAL FIELD

This invention relates generally to a multi-layer cybersecurity system and method for protecting digital wallet(s) holding blockchain-based token(s) traded on a financial platform. Specifically, the invention employs random temporal windowing in relation to both multi-party computation and multi-signature rekeying to protect the blockchain-based token(s) in the wallet from cyber-attack while allowing an oversight manager or a token issuer to control, recover control, or reconstitute holdings of the wallet in real time, if necessary.

BACKGROUND

The United States investment fund market is one of the most robust, varied and successful markets for investment products in the world. Its success can be attributed, in significant part, to the commitment of fund sponsors to responsible innovation and continuous improvement of the products they offer. This innovation-flexibility is a key feature of the Investment Company Act of 1940 (the "1940 Act").

Recently, discussions in the regulatory space focus on using public/private blockchain and distributive ledger technology to track and trade investment holdings, specifically, the tokenization of assets. Tokenization is the process of representing assets—such as shares of funds or cryptocurrency—in a digital infrastructure.

At the most basic level, blockchain-based tokens are divided into two types: utility tokens and security tokens. Blockchain-based tokens reside on a distributed system which includes multiple nodes, a journal, ledger, and a chain. The multiple nodes communicate with each other and arrive at consensus regarding the validity of transactions appended to their replicated journal(s). Through the use of public/private keys in the cryptographic signing of submitted transactions, entries are made on the journal, which affects state changes for the blockchain-based tokens in real time. Blockchain provides the desired transparency, but the theft of digital tokens does not present the same logistical issues as the theft of physical assets. A billion dollars of cash weighs ten (10) tons, while a billion dollars of blockchain based tokens can be controlled by private key data only a few hundred characters in size. As a result, digital security is paramount to prevent theft in an electronic environment.

A utility token is a "coin" backed up by a service or project. The token/coin represents a certain level of access to a service or product, which the holder can obtain by redeeming the token. For example, an Ether coin can be exchanged for access to decentralized applications (dApps) or to pay for smart contracts to be executed on the Ethereum blockchain. Bitcoin is another example of a blockchain-based utility token that provides access to a cryptocurrency-based environment. Because utility tokens provide access to a product or service, their value is inextricably linked to the popularity of those products or services.

A security token, on the other hand, need not have a utility. Rather than conferring a tangible benefit on the investor, a security token typically represents a share in the company or fund who issued it. For this reason, security tokens are also sometimes called "equity tokens." Security tokens are analogous to the way shares are bought on the traditional stock market to confer partial ownership of a company. In other words, the value of a security token is linked to the value of the issuer's underlying asset.

In fact, the link between well-established investment instruments and the dynamic world of crypto is where many see the primary value of blockchain-based tokens. These tokens potentially offer investors the security of a regulated instrument, combined with the speed and disintermediation of blockchain. Such changes could theoretically change the nature of investing forever. For example, even the most advanced stock exchanges in the world today still typically require up to 2 days to complete a transaction, involving multiple intermediaries such as clearing houses, settlement operations, and banks. Using blockchain, this period could be reduced to minutes and allow for 24/7 trading access while simultaneously eliminating the need for extraneous third parties.

The speed and access, however, presents certain risk. One leading risk is how custody will be maintained and what safeguards can be put in place to prevent and address market manipulation. Regarding custody, the 1940 Act requires each registered investment company to maintain its "securities and similar assets" in the custody of either one or more banks; a member firm of a national securities exchange; or the fund itself. The problem with the 1940 Act requirement is that any partially or fully centralized concentration of digital assets presents a target for cyber-attacks. But this concentration is necessary to support real-time trading and for oversight purposes. Similarly, the wallet(s) holding the tokenized assets is a target for cyber-attack and must be protected from cyber threats, while still being accessible to investors and, if necessary, regulators to prevent and address market manipulation.

The present invention outlines a multi-layered security model for the handling of investor instructions and regulatory oversight. At the center of this security system and method sits a blockchain-based token, or portion thereof, protected by the disclosed multi-layer security system and method.

By utilizing a public or private blockchain and distributive ledger technology in conjunction with the multi-layered security model described herein, security issues are addressed. This security assures the participants and regulators that the investor's instructions are being implemented in real-time and to the extent there is a suspected cyber security breach or market manipulation the token issuer or oversight manager (e.g., a regulator) can: (1) assume control of affected wallet(s), (2) recover control of any blockchain-based tokens transferred in contravention or without investor instruction, or (3) reconstitute the holdings of any affected wallet(s) at any time.

Not only can trades of digital assets be executed in real-time, but oversight managers or the token issuers can immediately correct any issues. Indeed, this invention provides the real-time security and transparency sought by investors, issuers, regulators, and law enforcement regarding blockchain-based digital tokens.

SUMMARY

This invention relates generally to a multi-layer cybersecurity system and method for protecting digital wallets holding blockchain-based token(s) traded on a financial platform. The invention uses multiple blockchain-based private key signatures held on devices that may be geographically distinct—the devices holding the private keys may be hundreds of miles apart. In addition, the devices holding the private keys only hold a portion of the private key. These devices use multi-party computation (MPC) as the method to achieve this, and those portions of a private key are known as "MPC shares". Furthermore, the system and method utilize random temporal windowing—a countdown timer randomly set between one (1) second and seven (7) days—and, when the random timeframe expires, the system and method randomly rotate the MPC shares on the storage devices. The system and method also uses temporal windowing for entirely re-keying the private keys that control user wallets. This randomness of the movement of the MPC shares and their phasing in and out of existence provides the security required to hold a blockchain-based token(s) on a device connected to the Internet, while still allowing an oversight manager or the token issuer to control, recover control, or reconstitute the holdings of the wallet in real time, if necessary. Simply put, the invention employs diversification, separation, and distribution to secure blockchain-based digital tokens.

This invention is a system or a method for securing blockchain-based token(s) traded on a financial platform. In certain embodiments, the blockchain-based token(s) will be minted by a token issuer. The system includes a software application and at least one processor of a computer device.

The software application receives an instruction to make a state change to the blockchain-based token(s), the instruction received from the investor, token issuer, or oversight manager.

Included with the instruction is a cryptographic signature signed by a separate private key held by the client and is compared to the public key stored as part of that client's blockchain wallet. This signature seeks to authorize the changing of the state of the blockchain-based token(s) from a first state to a second state.

The application also receives an environmental designation, previously configured or uploaded by an employee or agent of the token issuer or oversight manager, wherein the environmental designation identifies the private key signatures that reside in a hot environment (on a device connected to the Internet) and the private key signatures that reside on a cold environment (a device not connected to the Internet).

In addition, the application receives a signature weight designation, previously configured or uploaded by an employee or agent of the token issuer or oversight manager. The signature weight designation includes: a signature weight assigned to blockchain-based private key signatures residing primarily in a hot environment, and a signature weight assigned to blockchain-based private key signatures residing primarily in a cold environment. The signature weight assigned to private key signatures residing primarily in the cold environment is greater than the signature weight assigned to private key signatures primarily residing in the hot environment.

The application also receives a transaction weight designation previously configured or uploaded by an employee or agent of the token issuer or oversight manager, establishing a minimum signature weight required to effectuate different state changes to the blockchain-based token(s).

At least one processor is in communication through the wired and/or wireless communication network with the software application. The processor is configured to compare the instruction to the transaction weight designation and determine a minimum signature weight required to effectuate the state change. The processor also compares the environmental designation to the private key signatures and determine whether the private key signatures reside in a hot environment or a cold environment. The processor also compares the signature weight designation to the determination of the environment in which the private key signatures reside and determine the aggregate signature weight of the private key signatures. The processor then compares the aggregate signature weight to the minimum signature weight required to make the state change and, if the aggregate signature weight is greater than or equal to the minimum signature weight required to make the state change, then the processor is configured to generate and transmit a proposed transaction containing the state change, including an updated timestamp memorializing the date and time of the state change, to the blockchain-based token(s). Furthermore, the processor is configured to update or move the private key signatures or portions thereof between devices running a MPC protocol identified in the environmental designation at random time intervals selected from within a range of one (1) second to seven (7) days. At all times relevant, at least one processor is configured to monitor the state of the blockchain-based token(s) and when the state of the blockchain-based token(s) changes from a first state to a second state without an aggregate signature weight being greater than or equal to the minimum weight required to make the state change, at least one processor is configured to issue orders: (a) resetting the state of the blockchain-based token(s) back to the first state and (b) optionally, instructing the exchange to prohibit any transfers of the blockchain-based token(s) to parties other than the investor, token issuer, or oversight manager.

A method for protecting digital wallets holding blockchain-based token(s) minted by a token issuer is also disclosed. The method includes receiving an instruction from the investor, token issuer, or oversight manager to make a state change to the blockchain-based token(s). Accompanying the instruction is at least two blockchain-based private key signatures assembled using devices running a MPC. The two blockchain-based private key signatures seek to authorize the changing of the state of the blockchain-based token(s) from a first state to a second state. An environmental designation, previously configured or uploaded by an employee or agent of the token issuer or oversight manager, is also received. The environmental designation identifies the private key signatures that reside in a hot environment and the private key signatures that reside in a cold environment. A signature weight designation, previously configured or uploaded by an employee or agent of the token issuer or oversight manager, is also received. The signature weight designation includes: a signature weight assigned to blockchain-based private key signatures residing primarily in a hot environment, and a signature weight assigned to blockchain-based private key signatures residing primarily in a cold environment, wherein the signature weight assigned to private key signatures residing primarily in the cold environment is greater than the signature weight assigned to private key signatures residing primarily in the hot environment. A transaction weight designation previously configured or uploaded by an employee or agent of the token issuer or oversight manager, is received. The transaction weight designation establishes a minimum signature weight required to effectuate different state changes to the blockchain-based token. The method further includes continuously updating and moving the private key signatures or portions thereof between devices running the MPC protocol identified in the environmental designation at random time intervals selected from a timeframe of one (1) second to seven (7) days.

Under the disclosed method, upon receiving the instruction and the transaction weight designation, the method includes comparing the instruction to the transaction weight designation and determining a minimum signature weight required to effectuate the state change. In addition, upon receiving the environmental designation and the private key signatures, the methods include comparing the environmental designation to the private keys and determining whether the private key signatures reside in a hot environment or a cold environment. Upon receiving the signature weight designation and the environment in which the private key signatures reside, the method includes comparing the signature weight designation to the determination of the environment in which the private key signatures reside and determining the aggregate signature weight of the private key signatures. And, upon receiving the aggregate signature weight to the minimum signature weight required to make the state change, the method includes comparing the signature weight designation to the determination of the environment in which the private key signatures reside and determining the aggregate signature weight of the private key signatures.

The method also includes monitoring the state of the blockchain-based token(s) and, when the state of the blockchain-based token changes from the first state to the second state without the aggregate signature weight being greater than or equal to the minimum weight required to make the state change, the method further includes issuing orders: (a) resetting the state of the blockchain-based token back to the first state, and optionally, (b) instructing the exchange to prohibit any transfers of the blockchain-based token to parties other than the investor, token issuer, or oversight manager.

In certain embodiments, the method is comprised of five major components. First, a blockchain which may be any blockchain that supports multi-signature. Second, a multi-layered transaction signing infrastructure comprised of MPC signing wrapped by multi-signature and instantiated in both hot (online) and cold (offline) processors of MPC shares, whereby the signature potential of the hot processors are limited to low criticality operations and cold processors may perform any operation on the blockchain. The multi-layered transaction signing infrastructure may consist of MPC signing services wrapped with multi-signature requirements and incorporating temporal windowing of both MPC share and private key validity. Third, end-user application(s) that originate an instruction to perform an operation on the blockchain, which may take the forms of any user interface adapted to use a transaction signing service. Fourth, cryptographic intent signing which extends the cryptographic protections of a blockchain out and through the second and third aforementioned components. The cryptographic intent signing may consist of a public/private keypair using the same cryptography of the blockchain, whereby the public key is stored as part of the user's account data structure on the blockchain and the private key is stored as a secret on or accessible by the end-user application(s). Any positive number of these intent signing keys may exist and may be replaced, are controlled by the end user, and cannot be observed by any other party without the end user's permission or action. Fifth, multi-factor authentication whereby an end-user application(s) may authenticate or re-authenticate themselves through an escalating series of authentication techniques including but not limited to username/password, one time PIN, hardware or software identity key, client service escalation, and PII demonstration. The multi-factor authentication may comprise an array of authentication techniques and workflows supported by end-user application(s).

In summary, the system(s) and method(s) disclosed herein are based on MPC wrapped with multi-signature and are instantiated in both hot and cold environments. Beginning with the blockchain signature requirements, the invention is configured in a multi-signature structure whereby minimum weighted counts of signatures are required for different types of transactions to be valid for the accounts, which may utilize a decentralized protocol such as Stellar and/or smart contracts operating in a virtual environment such as an Ethereum Virtual Machine. In this way, oversight managers can control the types of transactions that can be performed with the lightweight hot signers vs those that require the heavyweight cold signers.

In addition, in certain embodiments, the same software stack that can perform MPC signatures is available in both pure software form suitable for 24/7 online transaction processing, as well as software plus hardware form suitable for powered down cold storage that lends itself to highly critical transactions, recovery, and backup purposes.

BRIEF DESCRIPTION OF THE DRAWINGS

Additional aspects, features, and advantages of the invention, both as to its structure, assembly, and use, will be understood and will become more readily apparent when the invention is considered in light of the following description of illustrative embodiments made in conjunction with the accompanying drawings, wherein.

DETAILED DESCRIPTION

Figure 1A:
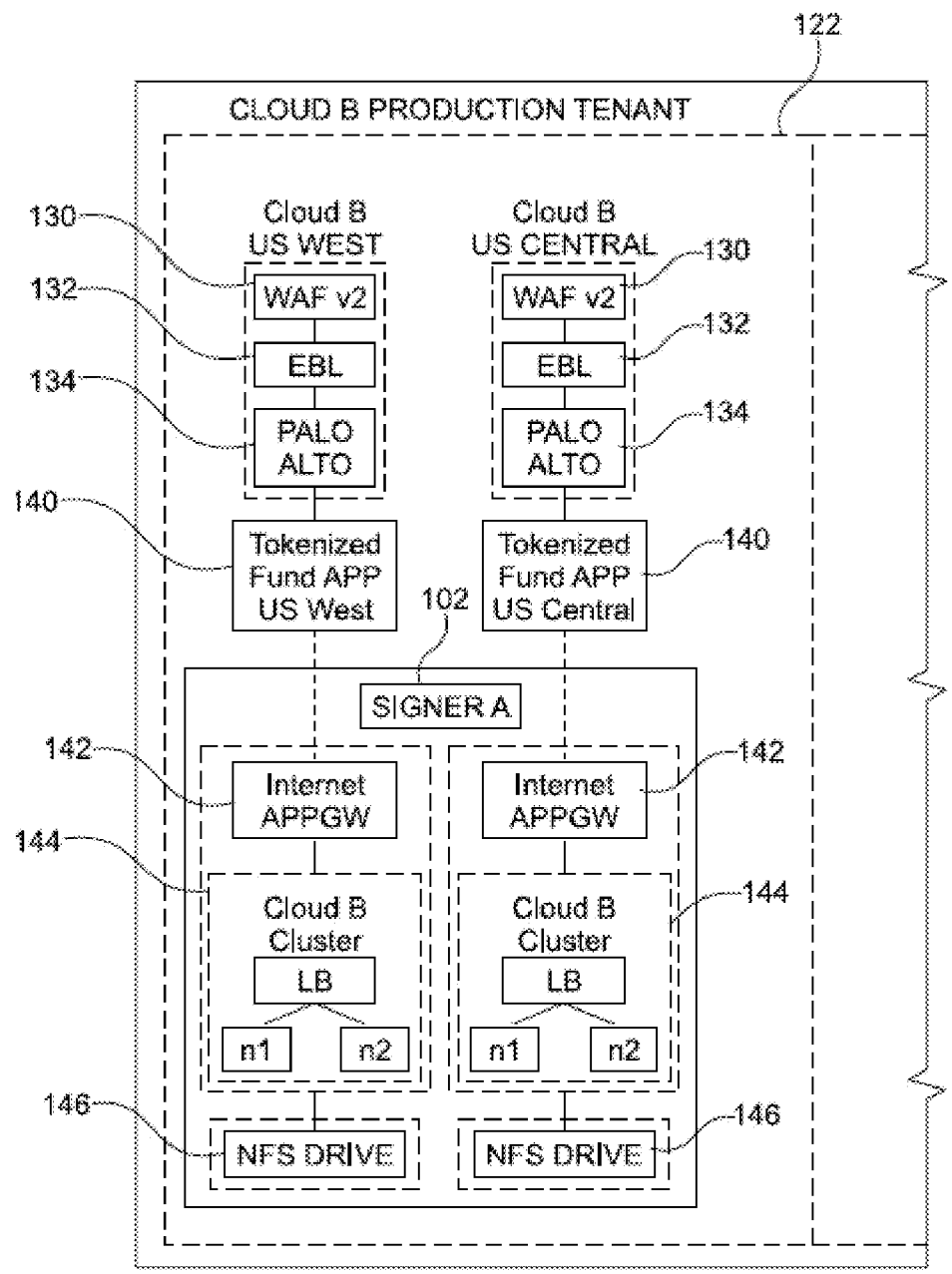
FIG. 1A illustrates an embodiment of the manner in which signers may operate in the hot environment.

Various embodiments of the systems and processes of the invention are described in detail below. Although specific implementations are described, this is done for illustration purposes only. A person skilled in the relevant art will recognize that other components and configurations may be used without parting from the spirit and scope of this disclosure.

Blockchain-Based Token(s)

The security of a blockchain-based token is at the heart of this invention. A blockchain-based token is a new type of digital asset at the intersection of investing, saving, and payment in the digital realm. The blockchain-based token may be a stablecoin or a native token, such as, for example, BitCoin. It may also be a security token. Regardless of form, the blockchain-based token is a unit of counting or quantities of an asset-like concept inherent to blockchain technology.

In certain embodiments, the blockchain-based token is an issuer-created token. The networks used to create these issuer-created tokens may be, for example, Ethereum or Stellar.

Regardless of type, the blockchain-based token disclosed herein defines multiple nodes, with a journal, ledger, and a chain. At its core, a blockchain is a distributed system which includes multiple nodes, which communicate with each other. A blockchain-based token in the present invention includes a sequenced list of state changes to tokens secured by the system and method disclosed herein and also operates programs called chaincode (e.g., smart contracts, etc.), which records transactions in a journal, maintains timely account data in a ledger, and executes transactions through the use of smart contracts, which verify that any required investor-specific keys (i.e., an investor signature) are present and the required signature weight threshold is met or exceeded. Some transactions are operations invoked on the chaincode. In certain embodiments, blockchain transactions must be "endorsed" by certain blockchain members. This endorsement or signature may be a signature-weight-based endorsement discussed below or a member-specific endorsement or signature. Regardless, the smart contracts attached to the token only permit properly endorsed/signed transactions to be committed to the blockchain to effect the state of the blockchain. Other transactions, which are not endorsed, are disregarded. There may also exist one or more special chaincodes for management functions and parameters, collectively called system chaincodes.

Nodes are the communication entities of the blockchain-based token. A "node" may perform a logical function in the sense that multiple nodes of different types can run on the same physical server. Nodes are grouped in trust domains with established trust lines and are associated with logical entities, which control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node that can receive client submitted transactions, commit the transactions, and maintain a state and a copy of the ledger of blockchain transactions. Peers can also have the role of an endorser, although it is not a requirement. An ordering-service-node or "orderer" is a node running the communication service for all nodes, and which implements a delivery guarantee, such as a broadcast to each of the peer nodes in the system when committing transactions and modifying a world state of the blockchain, which is another name for the initial blockchain transaction that normally includes a genesis block having control and setup information.

The journal is a sequenced, tamper-resistant record of all state transitions in the blockchain-based token. State transitions may result from chaincode invocations (e.g., transactions) submitted by participating parties (e.g., client nodes, ordering nodes, endorser nodes, peer nodes, etc.). A transaction results in a set of asset key-value pairs being committed to the journal as one or more operands, such as creates, updates, deletes, and the like. The ledger is a virtual book of participant accounts (which may also include a blockchain), which stores an immutable, classified record of postings. There is typically one ledger showing the current value of the blockchain-based token(s) for each "channel," which is a relationship based on trust lines between a token issuer and at least one investor holding the blockchain-based token(s). This ledger typically shows wallet address(es) holding blockchain-based tokens; the amount of token(s) held in each wallet; the current value of the blockchain-based token(s); any pending or settled transactions between the investor wallet(s) and/or the issuer wallet; and the historical transaction activity for each blockchain-based token. Each peer node maintains a copy of the ledger for each channel in a trust domain of which it is a member. A trust domain is defined by trust lines and establishes a principal relationship between investor(s) and token-issuer(s) as well as any intermediaries.

A chain is a transaction log structured as hash-linked blocks, and each block contains a sequence of N transactions where N is equal to or greater than one. The block header includes a hash of the block's transactions, as well as a hash of the prior block's header. In this way, all transactions on the ledger may be sequenced and linked cryptographically together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys (i.e., signatures), which are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup and before transactions are accepted.

Interplay of Hot and Cold Signers

The multi-layer security system and method disclosed herein contemplates both hot signers and cold signers who have varying weights assigned to their keys/signatures based on the environment in which the signer resides. Both hot and cold signing environments use the same software stack—including MPC—and are functionally compatible with each other. In certain embodiments, the difference is simply that the hot signers run in container clusters on virtual machines separated across operating environments (e.g., Azure and AWS), whereas cold signers run on portable hardware primarily disconnected from any network.

Members—such as investors, employees or agents of the token-issuer, or employees or agents of an oversight manager—who store their private keys on a device connected to the Internet (e.g., computer, mobile computer device, tablet, etc.) are known as hot signers because their key(s) reside on devices primarily connected to the Internet, the hot environment. Conversely, members—such as employees or agents of the token-issuer or oversight manager—who may store their private key(s) on a device running a hardened operating system with MPC shares of relevant private keys stored on an embedded hardware security module that is typically not connected to any network are known as cold signers as they reside outside the hot environment.

Cold signers can do anything hot signers can do, but signature weight guardrails prevent hot signers from taking certain actions reserved for cold signers. An employee or agent of the token issuer or oversight manager will have previously configured in the system or method a designated environmental multiplier for designated cold signers. For example, cold signers may have a multi-signature weight, which is three (3×) times the multi-signature weight of a hot signer. In such embodiments, there may be four (4) hot signers and six (6) cold signers. Based on this amount of hot and cold signers, an employee or agent of the token issuer or oversight manager may have previously set the weight threshold for token transfer(s) at two (2) and the weight threshold for wallet rekeying at six (6). With these settings in place, any two hot signers or a hot signer and a cold signer can transfer tokens. However, it takes at least two (2) cold signers to rekey wallet(s) because there are only four (4) hot signers, hot signers cannot rekey wallet(s).

In other words, hot signers may perform "low" and "medium" category operations, such as setting or storing data elements with the wallet address, establishing trust lines to the wallet(s) of the token issuer, and sending quantities of tokens held. Cold signers can do all operations performed by hot signers. However, cold signers may also perform "high" category operations such as freezing wallets, shifting control of wallets, re-keying of wallet(s), and reconstituting the holdings of the blockchain-based tokens. Hot-signers cannot perform these "high" category operations.

The weights assigned to cold signer signatures will always be greater than the weights given to hot signer signatures. For example, the weight given to cold signers may be two (2×) to ten (10×) times the weight given to hot signers. Indeed, it may be three (3×), four (4×), five (5×), six (6×), seven (7×), eight (8×), or nine (9×) times that of hot signers.

In certain embodiments, the weights given to cold signer(s) may be further stratified. For example, a cold signer who is an oversight manager (e.g., a regulator or bank) may have two (2×) times the weight of a cold signer who is an employee or agent of the token issuer.

These environmental guardrails allow a 24/7 online transaction processing setting to effect client transactional activity with no need to transfer tokens back and forth between cold and hot environments. Indeed, the blockchain-based token(s) may trade in a hot environment with the understanding that if an anomaly (e.g., a cyber-attack or market manipulation) is identified the cold signers could quickly and easily reset the blockchain-based token holdings to the time right before the anomaly occurred.

Figure 1B:
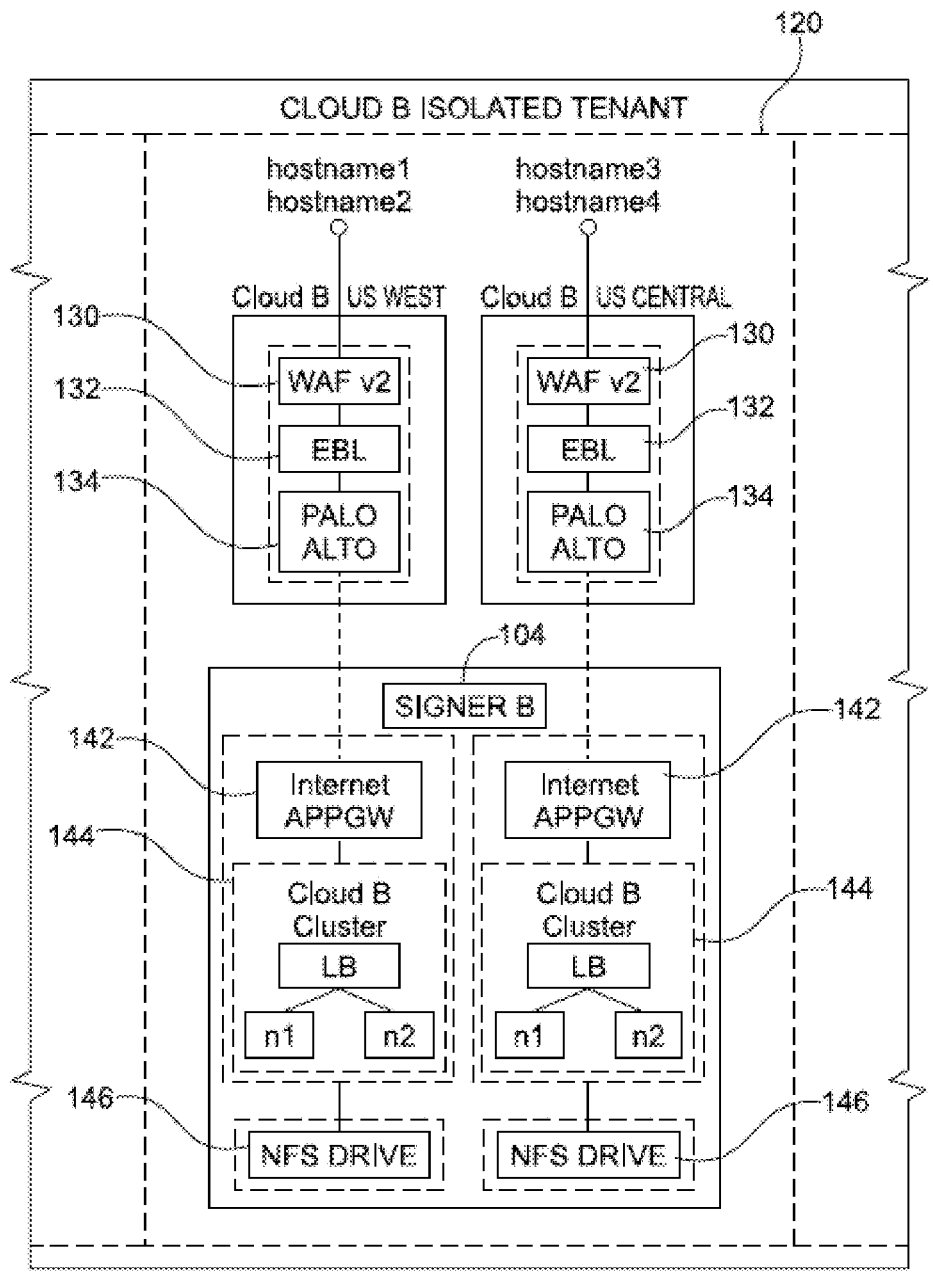
FIG. 1B illustrates an embodiment of the manner in which signers may operate in the hot environment.
Figure 1C:
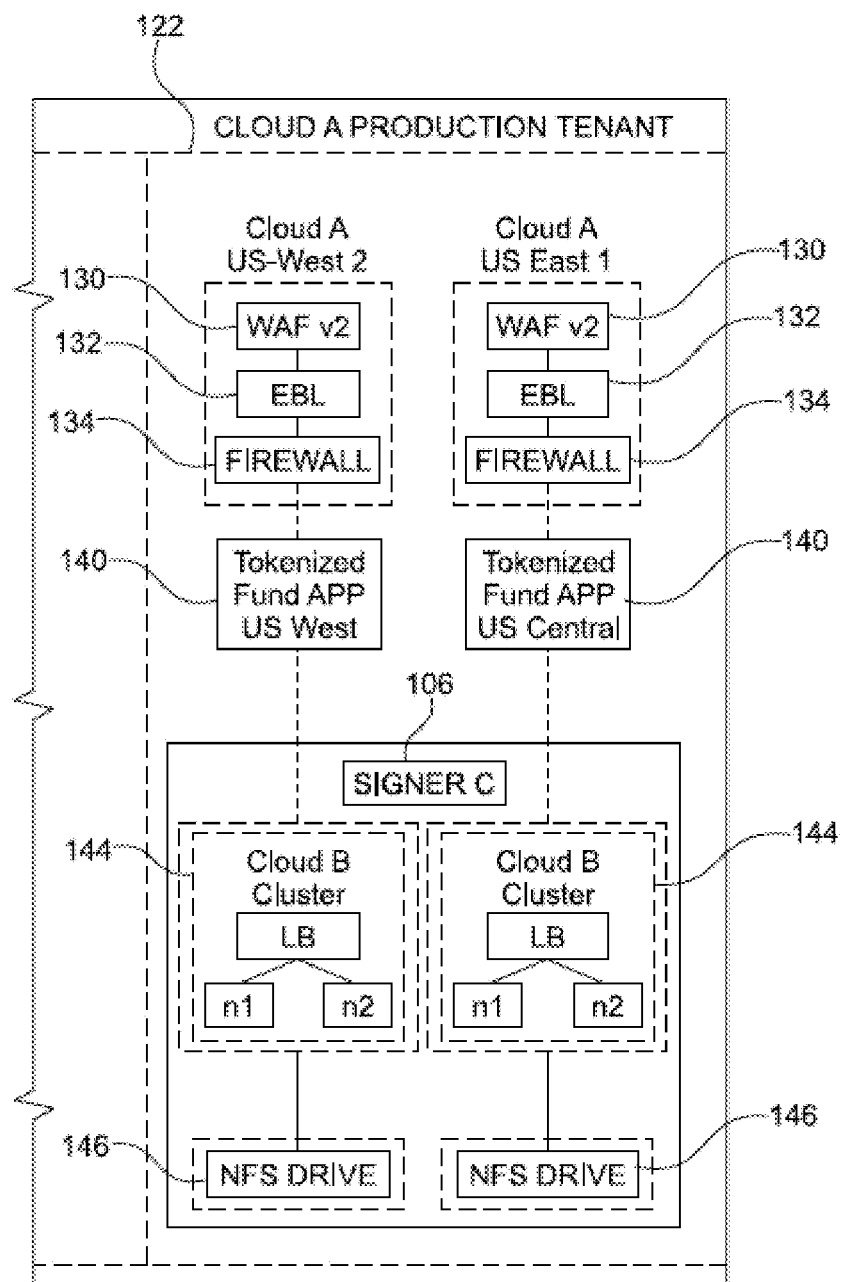
FIG. 1C illustrates an embodiment of the manner in which signers may operate in the hot environment.

FIGS. 1A, 1B, and 1C depict the manner by which hot signers may operate in the disclosed invention. There may be multiple signatures 102 104 106 required. The system and method disclosed may run on a single tenant cloud infrastructure 120 or a multi-tenant cloud infrastructure 122. The infrastructure may include one or more: (1) web application firewall(s) 130, elastic load balancer(s) 132, and (3) additional security protocols 134.

A software application may connect infrastructure elements via an application gateway 142 to at least one cloud cluster 144 utilizing a networking protocol for distributed file sharing 146. For embodiments using multi-tenant cloud infrastructure, the software application may reside on an investor's computer or mobile computing device. For example an investor's desktop, laptop, or phone. For other embodiments run using single tenant cloud infrastructure, the software application may reside entirely upon the infrastructure of the token issuer or oversight manager.

In certain embodiments, the infrastructure may by physically separated. For example, some or all of one piece of infrastructure may be located in the western United States while some or all of another piece of infrastructure may be located in the central United States.

Security Layering

The multi-layer security system and methods rely upon diversification, distribution, and random temporal windowing to protect against unauthorized access to the blockchain-based token(s). Individual signers may reside in different geographic locations. For example, one signer may reside in San Francisco with another signer residing in New York City.

The operating environments in which these signers work may be distinct with different access directories and access controls. For example. two signers may run on separate container clusters on separate virtual machines with one running on Microsoft Azure and the other running on Amazon Web Services. In such embodiments, the signers cannot access each other's clusters. Furthermore, signatures are assigned different weight(s) depending on the environment the signatories inhabit (e.g., hot or cold environments discussed below). All actions require a minimum signature weight threshold, which are previously configured in the multi-layer security system by an employee or agent of the token issuer or oversight manager (e.g., a regulator, an investment manager). Lower-level actions such as establishing trust-lines to the token issuer's wallet have a lower threshold than actions such as re-keying or transferring wallet control.

MPC is when two or more designated machines must perform a cryptographic signature to validate and transmit instructions, which is layered over the multi-signature requirement for added security. For example, two machines may hold cryptographically related data to that of a private key and then undertake a multi-step communication process between them to produce the correct signature of that private key all while never bringing that private key into existence or sharing each of their own cryptographic data with each other. MPC further disperses the system that must be identified and compromised to obtain an unauthorized version of a complete private key, which is never stored anywhere in the first place.

In certain embodiments, the number of machines capable of providing MPC security for the disclosed invention may be less than the number of machines actually used. For example, while forty (40) machines may be available, only fifteen (15) may be active at any one time. An employee or agent of the token issuer or an oversight manager will have previously configured available MPC machines. Furthermore, the machines running MPC and holding shards of the relevant private key may be randomly brought on-line or turned off so that the number of machines and their identities may be increased or decreased at random time intervals discussed below. In this regard, just because twelve (12) machines out of forty (40) are providing MPC services one minute does not mean that those same machines will be providing MPC services the next. It could be ten (10) completely new machines, or eighteen (18) machines made up of the original twelve (12) with six (6) new ones added and sections of the key distributed throughout the eighteen (18) machines. The relevant key(s) portions on each machine may be distributed equally or unequally and such holding may also be randomly reshuffled. This random MPC shuffling provides increased digital security.

Random temporal windowing for rotating the MPC designated machines and rekeying the multiple signatures provides the heightened security necessary to hold blockchain-based tokens in a hot environment. The rekeying or machine rotation may occur at the same time or at different times. The random time may be in a range of 1 second to seven days.

Wrapped around these security measures is an investor "intent signing" mechanism. This is where an entirely separate and investor-specific key pair—an investor specific signature—residing on the investor's device is used to protect the integrity of instructions transmitted by the investor all the way from the interfacing system (be it a mobile app in the hands of a client or applicant's user interface for investors) through to the hot and/or cold signers. In this regard, for certain low and medium level events, such as setting or storing data elements with the wallet address, establishing trust lines to other wallet(s), and sending quantities of tokens held the investor-specific key pair (i.e., the investor signature) must be present to validate the instructions.

In certain embodiments, an employee or agent of the token issuer or an oversight manager may previously have configured the system or method of transactions, which require the investor-specific key pair be present as part of the multi-signature requirement to be executed. Transactions that require an investor-specific key, but whose instructions are not signed with an investor-specific key, will be disregarded regardless of the signature weight of the signers validating the transaction.

Hybrid Recordkeeping

Figure 2:
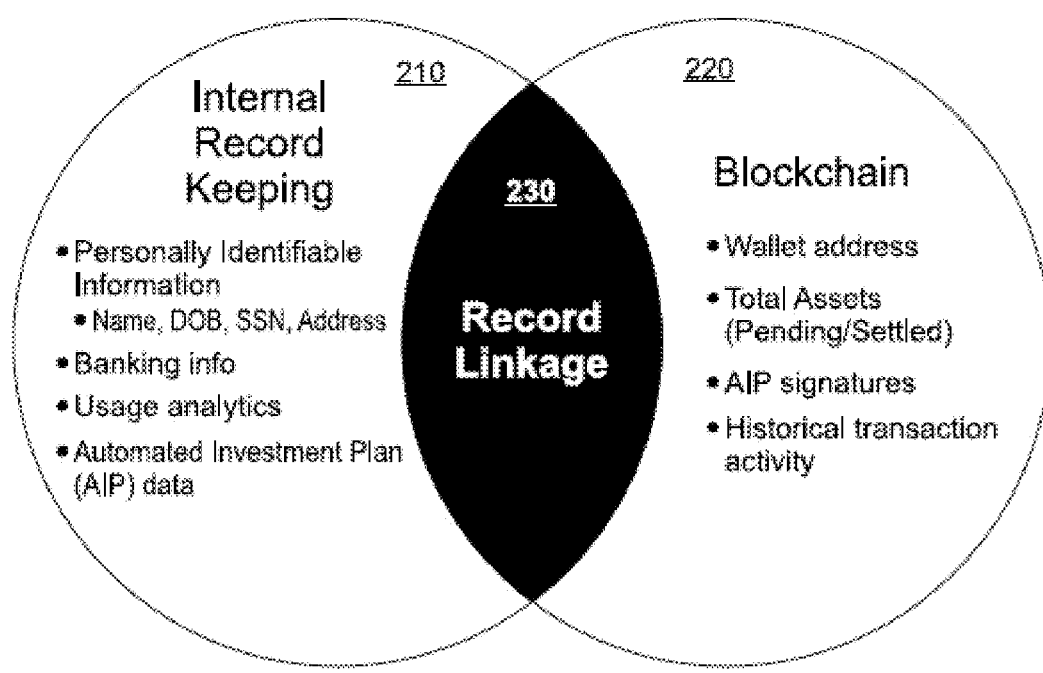
FIG. 2 illustrates what information is held on chain and what information is held off chain in the disclosed multi-layer security module for digitally securing a blockchain-based token(s).

Wrapped around the intent signing mechanism is a multi-factor authentication module. To assist with this module, certain withheld information 210 must be kept off-chain. Part of this withheld information 210 is personally identifiable information from investors. Other information 220 is placed on the chain. This on-chain information 220 may include a relevant wallet address, pending or settled asset identification, automated investment plan signatures, and historical transaction activity. The disclosed system and method may include information that links withheld information 210 to on-chain information 220. FIG. 2 depicts the linkage of information held in a secure location by the applicant with that input on the blockchain.

Regardless of how information is held, each party holding a token is first classified. To classify each party, the system creates and maintains a unique investor entity identifier ("IEI") for each investor entity. The system may associate subsidiaries with their parent entities; however, each entity will have their own unique IEI.

As previously disclosed above, the system is configured to permit the token issuer to: (1) set minimum signature weight threshold(s) for investor action; and (2) identify specific actions which require investor specific keys be present for an instruction to be valid. Instructions that lack sufficient weight or specific key pairs will be disregarded by the system and unable to be submitted to any blockchain as a result of missing the required signature(s). In certain embodiments, the system is configured to use a lattice design to assign the signature weight threshold in relation to the IEI of the current investor. Such a lattice design may be based on risk factors and/or preference ratings, which were previously configured in the software application by an employee or agent of the token-issuer. For example, an agent of the token-issuer, such as an agent bank acting as an oversight manager, may assign threshold ratings or rankings to borrower-IEIs or their wallet(s) based on factors selected from the group consisting of: (1) the number of trust lines with non-token-issuer wallet(s), (2) the age, or lack thereof, of established trust line(s); (3) the investor's previous trading, or lack thereof, of certain type or class of token(s); (4) directives from regulators; and (5) other factors. Such a preference rank may increase or decrease the signature weight(s) required to validate certain transactions.

In another instance, the agent banks or investment managers may require a second oversight manager (e.g., a regulator) to validate certain actions, such as resetting channel holdings if an anomaly is identified. Furthermore, the signing process may be bundled. For example, a hot signer may review two separate transactions—one IEI may seek to purchase a certain amount of one type of blockchain-based token and sell another type—and sign both transactions at the same time.

The unique IEIs may also be used to comply with regulations. For example, anti-money laundering regulations. Blockchain's veil of anonymity has frustrated such regulations in the past because it takes significant time and effort to identify the actual entity behind each wallet. During this investigation, the token issuer may continue to host or trade with a less than reputable entity. To address this issue, the processor of the system may be configured to monitor the reputation of the investor-IEI and upon the identification of an adverse event notify an oversight manager of: (1) the event, (2) the investor's current holdings, and (3) usage analytics for all wallet(s) linked to the specific IEI. The processor may be further configured to transmit, hold, or recall orders to all wallets associated with a flagged transaction along with stop transfer orders to any platform on which any flagged blockchain-based token(s) are traded. Such monitoring may occur at set intervals or may be continuous.

Furthermore, the token-issuers may also wish to restrict their securities to only those entities who are approved to buy and sell the asset that has been tokenized. For example, the token-issuer may only wish to deal with a qualified purchaser as defined in the 1940 Act. As previously disclosed above, currently, investors only initially know the party to whom they directly buy or sell the blockchain-based tokens. Token issuers can of course periodically check with the original investor to confirm they still hold the tokens. However, such follow up takes time. During such a delay, there is the potential for the original investor to sell the token to a third party that is not a qualified investor under the 1940 Act. Furthermore, even if the ultimate investor has been identified, current recall orders will take time to work their way through the current system and may not result in the return of the token.

In certain embodiments, delay is addressed by updating the blockchain and notifying the token issuer and any oversight managers whenever a token is transferred to an entity having a new or unknown IEI. In updating the blockchain, the processor is configured to create a new hash for the blockchain by consolidating the source transaction record on the most recent block of the blockchain with the investor transaction record. The newly-unified record has a separate transaction code but contains the most important data describing the token which may be selected from the group consisting of: the original token issuer, the original investor, an updated timestamp, updated investor, updated token value, denomination of value, and certain other descriptive fields. The processor accomplishes this unification by "querying" the "key" fields in the last block of the blockchain and then "joining" the records before "inserting" them in an updated hash that is transmitted to the blockchain. In addition, the processor may also be configured to further update a different set of files/tables stored on a server that is remote from the blockchain. In such an embodiment, the original records may be posted to a journal and the new value-related events may be posted to a separate ledger which the token issuer or oversight manager can view.

In certain embodiments, the updated blockchain remains a cryptographically secured relational database. "Cryptographically secure" not only means that transactions on the public blockchain cannot be performed without information (private keys) held in secret by parties authorized to do so, but also that transactions on the public blockchain can be made private by encrypting the contents of the transaction with various cryptographic techniques including public/private key pairs (PKI), Zero Knowledge Proofs (ZKP) and other obfuscation and encryption techniques. In certain embodiments, only token issuers or entities that have the decryption keys to the transaction can view the transaction. For example, the system may be configured to permit token issuers to sign and encrypt their information in the ledger and blockchain, then transmit the relevant key to an oversight manager for authentication. Furthermore, on subsequent transitions, the system may transmit the relevant private key to the token issuer and oversight manager, if any. Subsequent parties can still hash on the contents of the transaction to confirm consistency and correlation but not view it in its entirety. Only the original token issuer, and oversight managers or regulators, who may receive the keys from the original token issuer or oversight manager, can view the transaction in its entirety.

The unique IEIs also permit token issuers to direct their oversight managers to re-qualify investors based on evolving circumstances. This permits greater clarity and risk control for those token issuers and intermediaries with the inclination and ability to access and to understand the blockchain shared ledger.

Token Management

Embodiments of the systems and methods of the invention disclosed herein permit a supply restriction or token recall notice to be executed or, alternatively, to be repealed, in whole or in part, by sharing information and instructing all intermediaries simultaneously. Specifically, the processor is configured to notify the token issuer and any oversight manager of such orders. In certain embodiments, the smart contract may include a vehicle to appeal the recall notice based on off-chain facts or market conditions. As a result, this innovation not only can help token issuers, oversight managers, and regulators reduce risk but can also investigate and correct anomalies in the market that can minimize the need for security or market "circuit breakers" to be triggered. This invention allows token issuers to supplement or even pre-empt those regulatory impositions to their own benefit and that of their investor clients. Therefore, this invention permits more precise and dynamic restrictions by addressing individual anomalies, reducing the need to enact regulatory market interruptions.

Regulatory Compliance

U.S. regulators impose a wide range of requirements on participants in the securities finance markets. For instance, the Securities & Exchange Commission directs regulated broker-dealers and securities exchanges to follow procedures which prevent or limit trading when certain stressful conditions exist or anomalies are identified. In certain embodiments, this invention may automatically monitor activity and either flag or prevent suspected violations of regulations.

Moving forward, a discussion of the systems and methods surrounding the multi-layer security system and method using random temporal windowing is provided below. First, an outline of the system and method is disclosed. Second, the components of the system are discussed. Third, a description of a cloud computing system, the preferred environment of the system, is then disclosed.

SYSTEM OVERVIEW

The example embodiments are directed to systems, methods, devices, networks, non-transitory computer readable media, and/or systems, which support a multi-layer security solution using random temporal windowing to secure blockchain-based tokens in hot environments. The random time may be in a range of 1 second to seven days. More specifically, the invention provides security for a blockchain-based token for buying, selling, or trading blockchain-based tokens using at least one smart contract on a network comprising one or more cryptographically-signed blocks. Some of the benefits of such a solution include streamlined risk management and regulatory compliance reporting or oversight. Such a security integration allows token issuers, investors, and intermediaries to manage and report compliance to regulators and stakeholders, as well as to increase security for all interested parties, including regulators, by a) improving the liquidity and transferability of assets; b) reporting to regulators, and doing so in real time; and c) providing oversight managers, such as regulators or third party escrow agents, with the ability to investigate and if necessary reset the channel holdings if an anomaly (e.g., market manipulation or a cyber-attack) is detected.

As outlined above, the blockchain-based token is secured by multi-signature protocols. MPC is layered over the multi-signature requirement. Random temporal windowing is applied to rekeying the multiple signatures and rotating the MPC designated machines. Such rekeying and shuffling may occur at the same or different times. Adding to security is an investor "intent signing" mechanism requiring the investor signature appear on certain actions regardless of the signature weight threshold discussed above. Finally, multi-factor authentication is required for both the investor and any other signatories to sign any instructions affecting the holdings of the blockchain-based token. An unauthorized entity trying to reach the target wallet holding the blockchain-based token must not only compromise geographically distinct machines residing in both hot and cold environments but must do so before the keys to the wallet randomly reset or the machines having access to the wallet are randomly reshuffled. While the randomness provides strong security it does not negatively impact the desired transparency.

Figure 3:
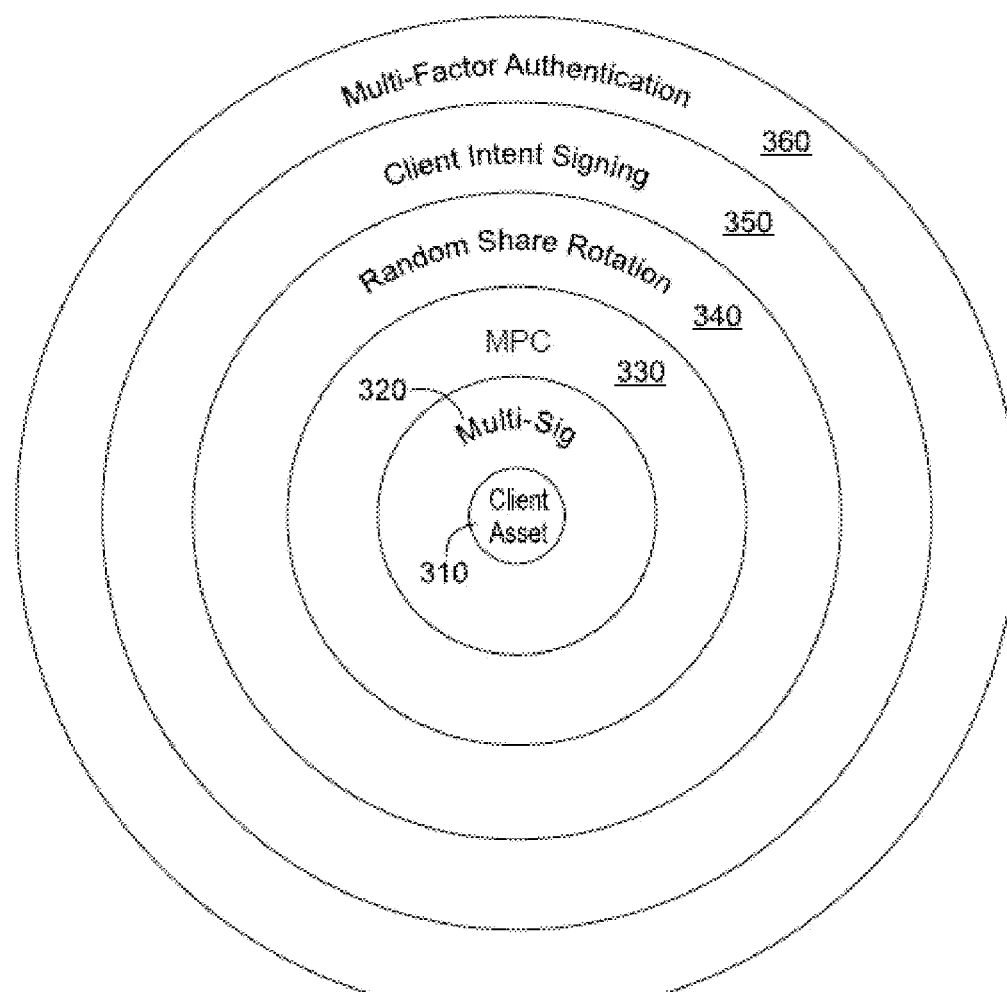
FIG. 3 illustrates an embodiment of the multiple layers of security disclosed herein for digitally securing a blockchain-based token(s).

FIG. 3 depicts the digital security layers of the disclosed invention that provide the necessary digital security without sacrificing transparency so that the blockchain-based token may reside in a hot environment.

As will be disclosed below, the token 310 is protected by a multi signature security layer 320 which multiplies the difficulty for any exploitative attack. Additional MPC security 330 is layered over the multi signature security layer 320. As a result, a single hardware break does not compromise the system and method. Random share rotation 340, whereby the movement of the MPC shares and their phasing in and out of existence occurs at random times, is utilized in connection with the MPC security measures. To provide added security, client intent signing 350 is layered over the random temporal windowing of the MPC shares. Finally, multi-factor authentication—e.g., biometrics, OT pins and passwords—are utilized as an external security layer for the disclosed system and method. These layers are discussed below.

Multi-Factor Authentication Layer

The initial security layer is multi-factor authentication (MFA). Authentication is classically divided into four distinct categories: 1) something an individual is, which may be any kind of biometric authentication involving identification of biological characteristics; 2) something an individual does, which may be any kind of behavior based authentication involving identification of behavioral characteristics; 3) something an individual knows, which relies on information from a user's memory; and 4) something an individual possesses, which typically extends protection by verifying that an individual has possession of some physical element, such as a physical dongle, for example. From a technical perspective, lifecycle management and operational processing of authentication credentials can differ for each category. From a security perspective, the authentication strengths of each category may vary. Any of these approaches can be bundled into the MFA layer.

MFA is a relatively new approach to user authentication security, stemming from the inadequacy of purely password-based authentication. Much of current MFA efforts involve the use of multiple steps for user authentication. For example, when conducting a purchase transaction, facial recognition software may be used in relation to the user. Other authentication mechanisms implement multi-factor authentication by using a static combination of two of the factor categories mentioned above.

In an example embodiment of MFA, a common policy framework enables policy enforcements to be carried out in the network or on the device. As described below, the framework may provide synchronization of policies and authentication results between a network entity and an entity on a user device.

In an exemplary, non-limiting embodiment, an authentication server (AS), for instance a multi-factor authentication server (MFAS) maintains at least one database, such that at least one database comprises user profile information related to a plurality of users, authentication information related to a plurality of user devices, and policy information related to a plurality of service providers. The MFAS may receive an authentication request from a first service provider of the plurality of service providers. In response to the authentication request, the MFAS may obtain information from at least one database to authenticate a first user of the plurality of users in accordance with the policy information related to the first service provider. The policy information may indicate an assurance level that is required by the first service provider, such that the first user is authenticated to a level that is sufficient as compared to the assurance level required by the first service provider. Further, databases may include a user database for maintaining the user profile information related to the plurality of users, a user equipment database for maintaining the authentication information related to the plurality of user devices, and a service provider database for maintaining the policy information related to the plurality of service providers.

As outlined above, the MFAS database may be housed off-chain. Thus, the information within the MFAS database will not be added to the chain.

Regardless, the purpose of the MFA layer is to confirm the individual seeking to access the wallet containing the blockchain-based token is in fact the investor or an individual authorized by the investor to access the wallet.

Client Intent Signing Layer

The client or investor intent signing layer is a second security module intended to confirm that it is the investor actually issuing the instructions. In this layer, an investor-specific key pair—an investor specific signature—residing on the investor's device must be submitted to authenticate the instructions provided.

This investor specific key may be subject to the random rekeying discussed above. However, investors would have to opt into such random rekeying and provide the token issuer or oversight manager with authorization to access the investor device.

Regardless of whether random rekeying is applied to the investor specific key, an employee or agent of the token issuer or an oversight manager may have previously configured the system or method of transactions to require the investor-specific key pair be present as part of the multi-signature requirement to be executed. Thus, transactions that require an investor-specific key but whose instructions are not paired with an investor-specific key will be disregarded, regardless of the signature weight of the signers validating the transaction.

MPC Layer

Secure MPC is a powerful concept in secure distributed computing. The goal of secure MPC is to enable a set of mutually distrusting parties to jointly and securely compute a function $f$ of their private inputs, even in the presence of a computationally unbounded active adversary. For example, two millionaires can compute which one is richer, without revealing their actual worth. In secure MPC, two or more parties want to conduct a computation based on their private inputs, but no party is willing to disclose its own input to anybody else.

Secure MPC participants can compute any function on any input, in a distributed network where each participant holds one of the inputs, ensuring independence of the inputs, correctness of the computation, and that no information is revealed to a participant in the computation beyond the information that can be inferred from that participant's input and output.

Like other cryptographic protocols, the security of MPC protocol can rely on different assumptions. For example, MPC can be computationally intensive such as a secret-sharing-based MPC, which is secure. Alternatively, the settings in which the scheme is described may differ, possibly assuming participants use a synchronized network, a secure and reliable broadcast channel exists, a secure communication channel exists between every pair of participants, such that an adversary cannot tap-in, modify or generate messages in the channel, and alike. In addition, secure MPC can be realized in various settings for computing general functions. However, the general scheme may be impractical due to efficiency reasons, partly due to the communication required among the participants.

In communication-less information theoretically secure MPC over long input streams, a dealer D may secretly share an initial value among the servers (participants). Subsequently, the dealer is responsible for handling the input stream (or an input file) and distributing appropriate shares to the participants. If the dealer is assumed to be a stateless dealer, the dealer is allowed to temporarily store the current input to the system, process the input and send (not necessarily simultaneously) secret shares of the inputs to the participants. In this invention, the token issuer or oversight manager may act as the dealer.

Conversely, the participants may alternate among themselves in serving as the dealer. The participant that acts as the dealer may be randomly assigned. In such a case, the randomly assigned participant communicates with the rest to convey the input (cryptographic shares), still the inherent quadratic complexity needed to reduce the polynomial degree in the classical information theoretically secure MPC should be avoided. Moreover, in case the input symbols have been shared and assigned to the participants in the initialization phase, every participant can independently (and asynchronously) process the shares of the input and send the result when the global output has to be determined. For example, assigning shares of a token up-front to participants to allow repeated search of patterns, without revealing either the token location or the search result to the participants. No participant returns any information back during the execution of the algorithm. At any point in the execution, the dealer may ask some participants to send their results back, and then, the dealer can reconstruct the actual result of the algorithm.

Multi-Signature Layer

The present invention employs a multiple signature (multi-sig) security layer.

In distributed systems, such as the one disclosed herein, the blockchain uses cryptographic libraries to run consensus operation or perform multi-signatures contracts ("M-out-of-N" contracts) An M-out-of-N contract is a transaction on the blockchain that requires a signature of M nodes and a verification from N nodes. In this regard, multiple private keys can be used where M/N (e.g., 2/3) keys are required to authenticate a transaction. As outlined above, distribution of keys among different devices who reside in different environments reduces the likelihood that an unauthorized user could access a wallet. For example, ten private keys may be generated with four (4) residing in a hot environment and the remaining six (6) residing in a cold environment.

The location where the keys reside—hot or cold environment—determines the signature weight of each key. For example, an agent or employee of the token issuer or oversight manager may previously assign a three (3×) times signature weight to keys in the cold environment. Such environmental based signature weighting has been previously configured or uploaded by an employee or agent of the token issuer or an employee or agent of an oversight manager. Again, a minimum weight of different private key signatures are needed to create a digital asset transaction. For example, a signature weight of 2 may be required to buy or sell tokens, whereas a signature weight of nine (9) may be required to rekey the relevant wallet(s).

In certain embodiments, regardless of signature weight, at least two signatures must be submitted to effectuate a market action.

Random Temporal Windowing

While the multiple layers of digital security provides protection for the blockchain-based token, the random temporal windowing for rekeying and shuffling devices using MPC provides significant additional security that an unauthorized user will find difficult to penetrate. Indeed, an unauthorized entity trying to reach the target wallet holding the blockchain-based token must not only compromise geographically distinct machines residing in both hot and cold environments but must do so before the keys to the wallet randomly reset or the machines possessing the keys are randomly reshuffled.

System Components

The system includes a general-purpose computing device, including a processing unit (CPU or processor), and a system bus that couples various system components including the system memory such as read only memory (ROM) and random-access memory (RAM) to the processor. The system can include a storage device connected to the processor by the system bus. The system can include interfaces connected to the processor by the system bus. The system can include a cache of high-speed memory connected directly with, in close proximity to, or integrated as pmi of the processor. The system can copy data from the memory and/or a storage device to the cache for quick access by the processor. In this way, the cache provides a performance boost that avoids processor delays while waiting for data. These and other modules stored in the memory, storage device or cache can control or be configured to control the processor to perform various actions. Other system memory may be available for use as well. The memory can include multiple different types of memory with different performance characteristics.

Computer Processor

It can be appreciated that the invention may operate on a computing device with more than one processor or on a group or cluster of computing devices networked together to provide greater processing capability. The processor can include any general-purpose processor and a hardware module or software module, stored in an external or internal storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

For clarity of explanation, an illustrative system embodiment is presented as including individual functional blocks including functional blocks labeled as a "processor". The functions such blocks represent may be provided through the use of either shared or dedicated hardware, including, but not limited to, hardware capable of executing software and hardware, such as a processor, that is purpose-built to operate as an equivalent to software executing on a general-purpose processor. For example, the functions of one or more processors may be provided by a single shared processor or multiple processors and use of the term "processor" should not be construed to refer exclusively to hardware capable of executing software. Illustrative embodiments may include microprocessor and/or digital signal processor (DSP) hardware, ROM for storing software performing the operations discussed below, and RAM for storing results. Very large-scale integration (VLSI) hardware embodiments, as well as custom VLSI circuitry in combination with a general-purpose DSP circuit, may also be provided.

System Bus

The system bus may be any of several types of bus structures including a memory bus or memory controller, a peripheral bus, and a local bus using any of a variety of bus architectures. A basic input/output (BIOS) stored in ROM or the like, may provide the basic routine that helps to transfer information between elements within the computing device, such as during start-up.

Storage Device

The computing device can further include a storage device such as a hard disk drive, a magnetic disk drive, an optical disk drive, a solid-state drive, a tape drive or the like. Similar to the system memory, a storage device may be used to store data files, such as location information, menus, software, wired and wireless connection information (e.g., information that may enable the mobile device to establish a wired or wireless connection, such as a USB, Bluetooth or wireless network connection), and any other suitable data. Specifically, the storage device and/or the system memory may store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld computing device, a desktop computer, or a computer server.

Although the preferred embodiment described herein employs cloud computing and cloud storage, it should be appreciated by those skilled in the art that other types of computer readable media which can store data that are accessible by a computer, such as magnetic cassettes, flash memory cards, digital versatile disks, cartridges, RAM, ROM, a cable or wireless signal containing a bit stream and the like, may also be used in the operating environment. Furthermore, non-transitory computer-readable storage media as used herein include all computer-readable media, with the sole exception being a transitory propagating signal per se.

Interface

To enable user interaction with the computing device, an input device represents any number of input mechanisms, such as a microphone for speech, a touch-sensitive screen for gesture or graphical input, keyboard, mouse, motion input, speech and so forth. An output device can also be one or more of a number of output mechanisms known to those of skill in the art such as a display screen, speaker, alarm, and so forth. In some instances, multimodal systems enable a user to provide multiple types of input to communicate with the computing device. The communications interface generally governs and manages the user input and system output. Furthermore, one interface, such as a touch screen, may act as an input, output and/or communication interface.

There is no restriction on operating on any particular hardware arrangement and therefore the basic features here may easily be substituted for improved hardware or firmware arrangements as they are developed.

Software Operations

The logical operations of the various embodiments disclosed are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor. These modules may be loaded into RAM or memory at runtime or may be stored as would be known in the art in other computer-readable memory locations. Having disclosed some components of a computing system, the disclosure now turns to a description of cloud computing, which is the preferred environment of the invention.

Cloud System

Cloud computing is a type of Internet-based computing in which a variety of resources are hosted and/or controlled by an entity and made available by the entity to authorized users via the Internet. A cloud computing system can be configured, wherein a variety of electronic devices can communicate via a network for purposes of exchanging content and other data. The system can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). The cloud resources can include a variety of hardware and/or software resources, such as cloud servers, cloud databases, cloud storage, cloud networks, cloud applications, cloud platforms, and/or any other cloud-based resources. In some cases, the cloud resources are distributed. For example, cloud storage can include multiple storage devices. In some cases, cloud resources can be distributed across multiple cloud computing systems and/or individual network enabled computing devices. For example, cloud computing resources can communicate with a server, a database, and/or any other network enabled computing device to provide the cloud resources.

In some cases, the cloud resources can be redundant. For example, if cloud computing resources are configured to provide data backup services, multiple copies of the data can be stored such that the data is still available to the user even if a storage resource is offline, busy, or otherwise unavailable to process a request. In another example, if a cloud computing resource is configured to provide software, the software can be available from different cloud servers so that the software can be served from any of the different cloud servers. Algorithms can be applied such that the closest server or the server with the lowest current load is selected to process a given request.

User Terminals

A user interacts with cloud computing resources through user terminals connected to a network by direct and/or indirect communication. Cloud computing resources can support connections from a variety of different electronic devices, such as servers; desktop computers; mobile computers; handheld communications devices (e.g., mobile phones, smart phones, tablets); set top boxes; network-enabled hard drives; and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment model. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. However, in other cases, cloud computing resources can be configured to restrict access to certain resources such that a resource can only be accessed from certain locations. For example, if a cloud computing resource is configured to provide a resource using a private deployment model, then a cloud computing resource can restrict access to the resource, such as by requiring that a user terminal access the resource from behind a firewall.

Service Models

Cloud computing resources can provide cloud resources to user terminals through a variety of service models, such as software as a service (SaaS), platforms as a service (PaaS), infrastructure as a service (IaaS), and/or any other cloud service models. In some cases, cloud computing resources can provide multiple service models to a user terminal. For example, cloud computing resources can provide both SaaS and IaaS to a user terminal. In some cases, cloud computing resources can provide different service models to different user terminals. For example, cloud computing resources can provide SaaS to one user terminal and PaaS to another user terminal.

User Interaction

In some cases, cloud computing resources can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources such as servers or database.

Cloud computing resources can provide a variety of functionality that requires user interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of cloud computing resources and/or the user terminal. Therefore, a UI can be implemented as a standalone application operating at the user terminal in some embodiments. In other embodiments, a web browser-based portal can be used to provide the UI. Any other configuration to access cloud computing resources can also be used in the various embodiments.

EXAMPLE

By way of a non-limiting example, the system or method may utilize seven keypairs (pubkeys only shown) utilizing the Stellar blockchain protocol, which represent seven possible signers:

TABLE 1

| Key No. | Exemplary Key | Assigned Weight |
|---|---|---|
| 1 | 51655468576D597133743677397A24432646294A404E635266556A586E327234 | 1 |
| 2 | 25432A462D4A614E645266556A586E3272357538782F413F4428472B4B625065 | 1 |
| 3 | 25442A472D4B6150645367566B59703373357638792F423F4528482B4D625165 | 1 |
| 4 | 397A24432646294A404E635266556A586E3272357538782F4125442A472D4B61 | 2 |
| 5 | 264528482B4D6251655468576D5A7134743777217A25432A462D4A404E635266 | 2 |
| 6 | 556A586E3272357538782F413F4428472B4B6250645367566B59703373367639 | 2 |
| 7 | 79244226452948404D6351665468576D5A7134743777217A25432A462D4A614E | 0 |

The first three keys with a corresponding weight of 1—Key Nos. 1-3 in Table 1—are keys corresponding to three hot signer MPC pairs. These keys are manifested in an MPC signing process with a weight of 1. The second three keys with a corresponding weight of 2—Key Nos. 4-6 identified in Table 1—are keys corresponding to three cold signer MPC pairs. The seventh key, which has no weight designation—Key No. 7 of Table 1—corresponds to the original keypair for the account. This seventh key may be a private key for this example and may be discarded and effectively disabled with this configuration.

This configuration then allows for low criticality operations to have a required signature weight of 2 such that 2 of 3 hot signers (e.g., those linked to Key Nos. 1 and 3 in Table 1) are required to sign a valid transaction, providing online transaction processing capabilities along with a measure of redundancy. High criticality operations on the other hand may have a required weight of 4, meaning that the hot signing environment alone is insufficient to render a valid signature for these operations; rather, at least one (or maximally 2 of 3) cold signers must be used.

Low criticality operations include basic functions such as transfer of token quantities, whereas high criticality operations include administrative functions such as adding or removing signers for the account, changing the weights of signers, changing the required weights of specific operations, and the like.

With the above established, the system or method may distribute both the hot signers and cold signers into different operating environments. In the case of the hot signers this may mean spreading them across different cloud computing environments to thoroughly separate their vulnerability and attack surfaces. In the case of cold signers this may mean geographic and operator distribution to thoroughly separate their physical disaster and bad actor risks.

Furthermore, these signing keys may be rotated over time, and the MPC shares of each signing key may also be rotated/refreshed over a random time horizon, resulting in a time-windowing of usability such that even if it were possible for an attacker to compromise both the hot and cold signing environments across multiple cloud compute platforms, and across multiple operators and geographies, the attacker would then have the additional challenge of having to do all of this within an unknown and constrained timeframe rather than being able to slowly assemble the cryptographic material over an extended period.

This diversification, separation, and distribution results in the desired information security.

While this subject matter has been disclosed with reference to specific embodiments, it is apparent that other embodiments and variations can be devised by others skilled in the art without departing from the true spirit and scope of the subject matter described herein.

What is claimed is:

1. A multi-layer cybersecurity system for protecting one or more digital wallet(s) holding blockchain-based token(s) minted by a token issuer, the system comprising:
    a software application, the application operating on a mobile computer device or on a computer device, in communication with the token issuer, an investor, and, optionally an oversight manager, the application is configured to receive:
        an instruction to make a state change to the blockchain-based token, the instruction received from the investor, token issuer, or oversight manager;
        at least two blockchain-based private key signatures assembled using devices running a multi-party computation protocol (MPC), the two blockchain-based private key signatures authorizing the changing of the state of the blockchain-based token from a first state to a second state;
        an environmental designation, previously configured or uploaded by an employee or agent of the token issuer or oversight manager, wherein the environmental designation identifies the private key signatures that reside in a hot environment and the private key signatures that reside in a cold environment;
        a signature weight designation, previously configured or uploaded by an employee or agent of the token issuer or oversight manager, wherein the signature weight designation includes:
            a signature weight ascribed to blockchain-based private key signatures residing primarily in a hot environment, and
            a signature weight ascribed to blockchain-based private key signatures residing primarily in a cold environment, wherein the signature weight ascribed to private key signatures residing primarily in the cold environment is greater than the signature weight ascribed to private key signatures primarily residing in the hot environment; and
        a transaction weight designation previously configured or uploaded by an employee or agent of the token issuer or oversight manager, establishing a minimum signature weight required to effectuate different state changes to the blockchain-based token;
    a processor in communication through the wired and/or wireless communication network with the software application, the processer is configured to:
        compare the instruction to the transaction weight designation and determine a minimum signature weight required to effectuate the state change;
        compare the environmental designation to the private key signatures and determine whether the private key signatures reside in a hot environment or a cold environment;
        compare the signature weight designation to the determination of the environment in which the private key signatures reside and determine the aggregate signature weight of the private key signatures; and
        compare the aggregate signature weight to the minimum signature weight required to make the state change and, if the aggregate signature weight is greater than or equal to the minimum signature weight required to make the state change, the processor is configured to generate and transmit to the blockchain-based token an update hash containing the state change, including an updated timestamp memorializing the date and time of the state change;
    wherein, the processor is further configured to update or move the private key signatures or portions thereof between devices running a MPC protocol identified in the environmental designation at a first random time interval;
    wherein, the processor is further configured to monitor the state of the blockchain-based token and when a state change to the blockchain-based token changes from a first state to a second state without the aggregate signature weight being greater than or equal to the minimum weight required to make the state change, the processor is configured to issue orders:
        resetting the state of the blockchain-based token back to the first state, and
        optionally, instructing the exchange to prohibit any transfers of the blockchain-based token to parties other than the investor, token issuer, or oversight manager.

2. The system of claim 1 wherein the first random time interval is from one (1) second to seven (7) days.

3. The system of claim 1, wherein the processor is further configured to notify the oversight manager when the blockchain-based token changes from a first state to a second state without the aggregate signature weight being greater than or equal to the minimum weight required to make the state change.

4. The system of claim 1, wherein the system creates and maintains a unique investor entity identifier ("IEI") for each investor.

5. The system of claim 4, wherein the processor is configured to use a lattice design to assign the signature weight threshold in relation to the IEI of the investor.

6. The system of claim 5, wherein the lattice design includes whether the investor is a qualified purchaser as defined under the Investment Company Act of 1940.

7. The system of claim 1, wherein the devices running MPC are brought on-line or turned off at a second random time interval.

8. The system of claim 7, wherein the second random time interval is from one (1) second to seven (7) days.

9. The system of claim 7, wherein the first random time interval and the second random time interval are different.

10. The system of claim 1, wherein there are more than ten (10) devices running MPC.

11. A method for securing one or more digital wallets holding blockchain-based token(s) minted by a token issuer, the method comprising:
receiving:
an instruction to make a state change to the blockchain-based token, the instruction received from the investor, token issuer, or oversight manager;
at least two blockchain-based private key signatures assembled using devices running a MPC, the two blockchain-based private key signatures authorizing the changing of the state of the blockchain based token from a first state to a second state;
an environmental designation, previously configured or uploaded by an employee or agent of the token issuer or oversight manager, wherein the environmental designation identifies the private key signatures that reside in a hot environment and the private key signatures that reside in a cold environment;
a signature weight designation, previously configured or uploaded by an employee or agent of the token issuer or oversight manager, wherein the signature weight designation includes:
a signature weight ascribed to blockchain-based private key signatures residing primarily in a hot environment, and
a signature weight ascribed to blockchain-based private key signatures residing primarily in a cold environment, wherein the signature weight ascribed to private key signatures residing primarily in the cold environment is greater than the signature weight ascribed to private key signatures primarily residing in the hot environment; and
a transaction weight designation previously configured or uploaded by an employee or agent of the token issuer or oversight manager, establishing a minimum signature weight required to effectuate different state changes to the blockchain-based token,
updating and moving the private key signatures or portions thereof between devices running the MPC protocol identified in the environmental designation at a first random time interval;
upon receiving the instruction and the transaction weight designation, comparing the instruction to the transaction weight designation and determining a minimum signature weight required to effectuate the state change;
upon receiving the environmental designation and the private key signatures comparing the environmental designation to the private keys and determining whether the private key signatures reside in a hot environment or a cold environment;
upon receiving the signature weight designation and the environment in which the private key signatures reside, comparing the signature weight designation to the determination of the environment in which the private key signatures reside and determining the aggregate signature weight of the private key signatures;
upon receiving the aggregate signature weight to the minimum signature weight required to make the state change and the minimum signature weight required to make the state change, comparing the signature weight designation to the determination of the environment in which the private key signatures reside and determining the aggregate signature weight of the private key signatures; and
monitoring the state of the blockchain-based token and when a state change to the blockchain-based token changes from the first state to the second state without the aggregate signature weight being greater than or equal to the minimum weight required to make the state change, the processor is configured to issue orders:
resetting the state of the blockchain-based token back to the first state, and optionally, instructing the exchange to prohibit any transfers of the blockchain-based token to parties other than the investor, token issuer, or oversight manager.

12. The method of claim 11 wherein the first random time interval is from one (1) second to seven (7) days.

13. The method of claim 11, further comprising notifying the oversight manager when the blockchain-based token changes from a first state to a second state without the aggregate signature weight being greater than or equal to the minimum weight required to make the state change.

14. The method of claim 11, further comprising creating a unique investor entity identifier ("IEI") for each investor.

15. The method of claim 14, further comprising using a lattice design to assign the signature weight threshold in relation to the IEI of the investor.

16. The method of claim 15, wherein the lattice design includes whether the investor is a qualified purchaser as defined under the Investment Company Act of 1940.

17. The method of claim 11, wherein the devices running MPC are brought on-line or turned off at a second random time interval.

18. The method of claim 17, wherein the second random time interval is from one (1) second to seven (7) days.

19. The method of claim 17, wherein the first random time interval and the second random time interval are different.

20. The method of claim 11, wherein there are more than ten (10) devices running MPC.

* * * * *